(12) United States Patent
Pimenta et al.

(10) Patent No.: US 9,096,914 B2
(45) Date of Patent: Aug. 4, 2015

(54) PROCESS FOR THE OPTIMIZED PRODUCTION OF IRON ORE PELLETS

(71) Applicant: VALE S/A, Rio de Janeiro (BR)

(72) Inventors: Hamilton Porto Pimenta, Belo Horizonte (BR); Marcus Eduardo Emrich Botelho, Belo Horizonte (BR)

(73) Assignee: VALE S.A., Rio de Janiero (BR)

( * ) Notice: Subject to any disclaimer, the term of this patent is extended or adjusted under 35 U.S.C. 154(b) by 91 days.

(21) Appl. No.: 13/948,933

(22) Filed: Jul. 23, 2013

(65) Prior Publication Data

US 2014/0020511 A1 Jan. 23, 2014

Related U.S. Application Data

(60) Provisional application No. 61/674,633, filed on Jul. 23, 2012.

(51) Int. Cl.
| | |
|---|---|
| *C22B 1/24* | (2006.01) |
| *C22B 1/20* | (2006.01) |
| *C21B 13/00* | (2006.01) |
| *C22B 1/243* | (2006.01) |

(52) U.S. Cl.
CPC ............ *C22B 1/2406* (2013.01); *C21B 13/0053* (2013.01); *C22B 1/20* (2013.01); *C22B 1/243* (2013.01)

(58) Field of Classification Search
CPC ........ C22B 1/2406; C22B 1/20; C22B 1/243; C21B 13/0053
USPC ............................................. 75/733, 755, 772
See application file for complete search history.

(56) References Cited

U.S. PATENT DOCUMENTS 5,002,607 A * 3/1991 Flesher et al. .................. 75/767
2013/0243973 A1* 9/2013 Dutra et al. .................... 427/560

FOREIGN PATENT DOCUMENTS

| CA | 2780897 A1 * | 5/2011 |
| DE | 41 09 396 A1 | 9/1992 |
| JP | 04080327 A * | 3/1992 |

OTHER PUBLICATIONS

Derwent Acc No. 2012-H88975 for patent family including RU 2010118897 A by Chernavin et al published Nov. 2011.*
Machine translation of RU 2010118897 published Nov. 2011.*
Machine translation of JP 04080327 A and JP 95096688 B2 published Mar. 1992 and Oct. 1995, respectively.*

* cited by examiner

*Primary Examiner* — George Wyszomierski
*Assistant Examiner* — Tima A McGuthry Banks
(74) *Attorney, Agent, or Firm* — Arent Fox LLP

(57) ABSTRACT

The present invention describes an advantageous and effective streamlined process for the production of iron ore pellets, the green pellets replacing the burnt pellets for covering the metallic surface in "travelling grate" furnace during the burning step, the process comprising at least some or all of the steps of grinding the iron ore; filtering the crushed iron ore; mixing the filtered iron ore with at least one binder; pelletizing the mixture; drying the green pellets; transferring the pellets to the side and bottom grids of a "travelling grate" furnace equipment and screening the burnt iron ore pellets. An optimized process for the production of iron ore pellets is provided that is innovative, efficient and economical when compared to currently known processes.

17 Claims, No Drawings

PROCESS FOR THE OPTIMIZED PRODUCTION OF IRON ORE PELLETS

This application claims priority from U.S. Patent Application No. 61/674,633, titled "Process Optimized for the Production of Ore Pellets," filed on Jul. 23, 2012, and which is incorporated herein by reference in its entirety.

FIELD OF THE INVENTION

Aspects of the present invention relate to an optimized process for the production of iron ore pellets efficiently and economically, particularly when compared to currently known processes, once it uses the total volume of the burning machine.

BACKGROUND OF THE INVENTION

The pelletizing process is a compression or molding of a material in the form of pellets. A variety of different materials can undergo such a process, including chemicals, iron ore, animal feed, and the like. In the case of iron ore pellets, ultrafine particles are obtained by means of a heat treatment. An ultrafine fraction (below 0.15 mm) is thus found in nature or generated in the processing. The pellet can be formed in spherical clusters of various sizes ranging from 8 to 18 mm, with features suitable for feeding of reduction units, such as blast furnaces.

In all pelletizing processes of iron ores used industrially, there is a step of thermal hardening of the pellets. One of the known processes applies a "Traveling Grate" type furnace. In this case, the burning of the material takes place in a bed of pellets placed on a metallic surface with a limited working temperature, in order to avoid damage to the equipment. These limits imply lower temperatures in the layers closer to the metal surfaces; such temperatures are not sufficient to ensure a complete sintering of the particles, which does not allow filling the entire volume of the burning equipment with green pellets. In these processes, a layer of recirculated burnt pellets is applied on the metal surfaces, side and bottom, in order to avoid the said problems.

The said traveling grate furnace process to produce burnt pellets of iron ore requires the recirculation of 20 to 30% by weight of the produced material to form the liner layer, side and bottom, in the metallic surfaces.

DE 4109396 describes a method of production of iron ore pellets, comprising recirculating cover elements which protect the metallic structure of the heating equipment.

So no teaching or knowledge of prior art discloses a process for pelletizing iron ores which brings a more innovative, efficient and economical solution for the metallic surfaces heating problem during the iron ore pellet's burning step, bringing inconvenience in the production thereof.

BRIEF DESCRIPTION OF THE INVENTION

In light of the above described problems and unmet needs, the present invention provides an advantageous and effective streamlined process for the production of iron ore pellets, the green pellets replacing the burnt pellets for covering the metallic surface in a travelling grate furnace during the burning step, the process comprising . . . f. transferring the pellets of iron ore to the side and bottom grids of a travelling grate furnace equipment.

g. Screening the burnt iron ore pellets.

Additional advantages and novel features of these aspects of the invention will be set forth in part in the description that follows, and in part will become more apparent to those skilled in the art upon examination of the following or upon learning by practice of the invention.

DETAILED DESCRIPTION OF THE INVENTION

The following detailed description does not intend to, in any way, limit the scope, applicability or configuration of the invention. More exactly, the following description provides the necessary understanding for implementing the exemplary modalities. When using the teachings provided herein, those skilled in the art will recognize suitable alternatives that can be used, without extrapolating the scope of the present invention.

The present invention, more specifically, describes a process for the production of iron ore pellets, the green pellets replacing the burnt pellets for covering the metallic surface in a travelling grate furnace during the burning step, the process comprising . . . f. transferring the pellets of iron ore to the side and bottom grids of a travelling grate furnace equipment.

g. Screening the burnt iron ore pellets.

Aspects of the present invention relate to a streamlined process for the production of iron ore pellets, the green pellets replacing the burnt pellets for covering the metallic surface in "travelling grate" furnace during the burning step, comprising the following steps:

a. grinding the iron ore and limestone or dolomite, preferably, in order to get a $CaO/SiO_2$ ratio in the dry pellet of less than 0.20, for example, about 0.15, or preferably 0.90 or above. The addition of lime is mainly to ensure metallurgical quality of the final product. The grinding step results in a product with about 90% of the material less than 0.044 mm and a specific surface area of about $1800\ cm^2/g$. The grinding is via a vertical wet ball mill and some auxiliary equipment such as, press rolls. The wet grinding can be done in a closed circuit with hydrocyclones or opened circuit. If the closed circuit is used, the grinded product can be sent to a thickener for dewatering, increasing the solids content in the pulp by about 20 to 75% by weight. In the case of wet grinding in open circuit, the final material can be sent directly to the tank of homogenization. In certain example aspects, the limestone may comprise a mixture of calcium carbonate ores and a source of MgO comprising olivine, magnesite, serpentinite or industrial wastes which are rich in MgO.

b. filtering the crushed iron ore obtained from step a, to reduce moisture to about 9% by weight, c. mixing the filtered iron ore from step b with at least one binder. This is a critical step to the process and involves combining iron ore with sodium silicate with a molar ratio of $SiO2/Na2O=2.40$ and corn starch, preferably gelatinized, and microsilica, ultra-fine (100<0.044 mm) and its percentage by weight of SiO2 (% SiO2>99%), additionally. The following demonstrate the functionality for the binders used:

i. The sodium silicate may improve the compressive strength of the dried green pellets.

ii. Cornstarch may improve the quality of the green pellets, wet and dry. When in the production of the green pellet, the cornstarch has the role of controlling the pelletizing process due to its high capacity to absorb water.

iii. The microsilica improves the performance of sodium silicate.

The ratios of binders in the mix, on a dry basis, may comply with the following:

i. Sodium Silicate: from 1 to 4% by weight, but preferably 3% by weight.

ii. Corn starch: from 1 to 2% by weight, but preferably 1.5% by weight.

iii. Microsilica: maximum of 0.50% by weight, but preferably 0.30% by weight.

d. pelletizing the mixture from step c.;

e. drying the green pellets from step d. Drying is preferably done in static bed dryers under temperatures of about 150° C., in order to ensure the polymerization of sodium silicate, avoiding losses of the cornstarch during the process. The resistance of the dried green pellet may be at least of 60 daN/p so it is resistant to the handling and loading in the "traveling grate" pelletizing furnace. At this step, the heating rate is preferably controlled to avoid the appearance of cracks in the pellets, which impairs their resistance.

f. transferring the pellets of iron ore to the side and bottom grids of a travelling grate furnace.

g. Screening the burnt iron ore pellets.

The present invention may provide one or more of the following advantages relative to the prior art techniques:

i. Total use or high use of the volume inside the pelletizing equipment of the green pellets, thus increasing its productivity;

ii. It is no longer necessary to recirculate the burnt pellets discharged from the metallic surface as in the prior art processes, then forming the liner layer, increasing the productivity of the metallic surface;

iii. Optimization of the energy power in the process, thus reducing the production costs.

In this sense, the main innovative characteristics of the present invention may include one of more of:

i. In the mixing step c, the use of conventional binders combined with other organic binders or auxiliary materials in order to confer resistance to the green pellets during the handling and/or transferring to the side and bottom grids and feeding the furnace;

ii. The green pellet produced with the mixture of step c, instead of being transferred to the burning furnace, is sent to a dryer. Thus the dried product is resistant enough to be transferred (about 100 to about 80 kg/w) to the side and bottom grids of the travelling grate furnace equipment.

iii. The dried green pellets is fed into the side and bottom grids of the travelling grate furnace equipment, thus replacing the burnt pellets used in the prior art, and unloaded in the oven as a product and following the normal flow known.

The examples given above are preferred variations of the process object of this invention and should not be construed as limitations. In this respect, it should be understood that the scope of the present invention covers other possible variations, being limited only by the contents of the attached claims, including the possible equivalents.

The invention claimed is:

1. A process for the production of iron ore pellets, where green pellets replace burnt pellets for covering a metallic surface in a travelling grate furnace during a burning step, the process comprising:

grinding iron ore and limestone to a size less than 0.044 mm to form a crushed iron ore;

filtering the crushed iron ore to form a filtered iron ore;

mixing the filtered iron ore with at least sodium silicate and cornstarch and, optionally, microsilica, to form a mixture;

pelletizing the mixture to form the green pellets;

drying the green pellets to form dried green pellets;

transferring the dried green pellets of the iron ore to a side grid and a bottom grid of the travelling grate furnace and forming burnt iron ore pellets; and screening the burnt iron ore pellets.

2. The process according to claim 1, wherein the grinding step comprises a ratio of limestone or dolomite which ensures that the pellets have a ratio of $CaO/SiO_2<0.20$ or $>0.90$.

3. The process according to claim 1, wherein the limestone comprises a mixture of calcium carbonate ores and a source of MgO comprising olivine, magnesite, serpentinite or industrial wastes which are rich in MgO.

4. The process according to claim 1, wherein the sodium silicate comprises a molar ratio of $SiO_2/Na_2O$ in a range between 1 and 4% by weight.

5. The process according to claim 1, wherein the corn starch is gelatinized and is added in a range between 1 and 2% by weight.

6. The process according to claim 1, wherein 100% of the microsilica comprises a size <0.044 mm with more than 99% by weight of $SiO_2$ and wherein the microsilica is added to the mixture in a range between 1 and 2% by weight.

7. The process according to claim 1, wherein the green pellets are dried under a temperature of 150° C.

8. The process according to claim 1, wherein about 90% by weight of the crushed ore comprises a size less than 0.044 mm.

9. The process according to claim 1, wherein the crushed ore has a specific surface area of about 1800 $cm^2/g$.

10. The process according to claim 1, wherein the grinding step comprises grinding the iron ore and limestone with a vertical wet ball mill.

11. The process according to claim 1, wherein grinding the iron ore and limestone is in a closed circuit comprising a hydrocyclone, and wherein the crushed iron ore is thickened to increase a solids content by about 20 to 75% by weight before filtering.

12. The process according to claim 1, wherein the filtering step comprises reducing a moisture content of the crushed iron ore by about 9% by weight.

13. The process according to claim 1, wherein the sodium silicate comprises a molar ratio of $SiO_2/Na_2O=2.40$.

14. The process according to claim 1, wherein the mixture comprises sodium silicate at 1 to 4% by weight, corn starch at 1 to 2% by weight, and microsilica of no more than 0.50% by weight.

15. The process according to claim 1, wherein the step of drying comprises drying the green pellets in a static bed dryer.

16. The process according to claim 1, wherein the step of drying comprises polymerizing the sodium silicate.

17. The process according to claim 1, wherein the dried green pellets each have a resistance of at least 60 daN/p.

* * * * *